Figure 1:
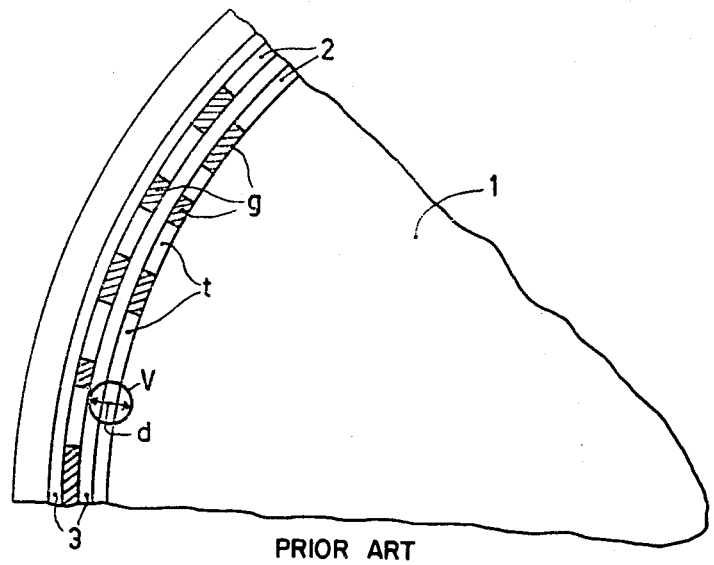

United States Patent [19]

Bouwhuis et al.

[11] 3,999,008
[45] Dec. 21, 1976

[54] RECORD CARRIER ON WHICH INFORMATION IS STORED IN AN OPTICALLY READABLE STRUCTURE WITH DITHER FOCUSSING SIGNALS ALSO BEING STORED

[75] Inventors: Gijsbertus Bouwhuis; Christiaan Hendrik Frans Velzel, both of Eindhoven, Netherlands

[73] Assignee: U.S. Philips Corporation, New York, N.Y.

[22] Filed: Apr. 29, 1974

[21] Appl. No.: 464,841

[30] Foreign Application Priority Data

Feb. 14, 1974 Netherlands ............... 7402012

[52] U.S. Cl. .................. 358/128; 179/100.3 V; 274/41 R
[51] Int. Cl.² .................. H04N 5/76; G11B 7/24
[58] Field of Search ............... 178/DIG. 29, 6.6 R, 178/6.7 R, 6.7 A, 6.6 DD; 179/100.3 V, 100.3 G, 100.4 R, 100.4 M, 100.4 C, 100.41 L; 250/201–203; 340/173 LM; 360/70, 77; 274/41 R, 42 R, 41.6 R

[56] References Cited

UNITED STATES PATENTS

| 3,126,535 | 3/1964 | Streeter | 360/77 |
| 3,663,764 | 5/1972 | Trost | 360/70 |
| 3,673,412 | 6/1972 | Olson | 250/201 |
| 3,800,100 | 3/1974 | Runge | 179/100.4 C |
| 3,829,605 | 8/1974 | Pickopp | 179/100.41 P |
| 3,833,769 | 9/1974 | Compaan et al. | 179/100.3 V |
| 3,848,095 | 11/1974 | Wohlmut et al. | 179/100.3 V |
| 3,931,460 | 1/1976 | Watson | 179/100.3 V |

OTHER PUBLICATIONS

Frosch et al., IBM Tech. Disc. Bulletin, vol. 15, No. 2, July, 1972, pp. 504–505.

*Primary Examiner*—Raymond F. Cardillo, Jr.
*Attorney, Agent, or Firm*—Frank R. Trifari; Simon L. Cohen

[57] ABSTRACT

A record carrier is described on which information is stored in an optically readable structure of trackwise arranged areas and intermediate areas. By giving at least one of the surfaces of the record carrier body excursions which are periodically variable in the track direction, it is possible in a simple manner to obtain an indication of the focussing of the read beam on the information structure during reading of the record carrier.

3 Claims, 9 Drawing Figures

RECORD CARRIER ON WHICH INFORMATION IS STORED IN AN OPTICALLY READABLE STRUCTURE WITH DITHER FOCUSSING SIGNALS ALSO BEING STORED

The invention relates to a record carrier on which information is stored in an optically readable structure of areas and intermediate areas arranged along tracks, which areas have a different influence on a read beam of radiation than the intermediate areas. The invention also relates to an apparatus for reading such a record carrier.

In this specification tracks is to be understood to mean those track portions which, viewed in the lateral direction of the track portions, are adjacent to each other. For a round disk-shaped record carrier a track is a track portion which extends along one revolution on the record carrier. A spiral track is the total of merging quasi-concentric tracks on a round disk-shaped record carrier. A record carrier consists of a record carrier body on which an information structure is disposed and, as the case may be, a protective layer on said information structure.

It has been proposed, for example in the previous U.S. Patent Application Ser. No. 229,285, filed Feb. 25, 1972, abandoned in favor of Continuation Application Ser. No. 396,399, filed Sept. 12, 1973, which has been laid open for public inspection, to store a color television program in a record carrier as described above. For example, a round disk-shaped record carrier may contain a 30 -minute in a multitude of tracks, the outer track having a radius of approximately 15 cm and the inner track a radius of approximately 8 cm. The period, in the radial direction, of the tracks is then approximately 2 $\mu$m.

The record carrier can be read optically by focussing a read beam of radiation onto the optical structure, and moving the radiation spot thus formed and an information track relative to each other. The read beam of radiation is then modulated in accordance with the sequence of areas and intermediate areas in a track. The modulated read beam is converted by a radiation-sensitive detector into an electrical signal from which for example picture and/or sound may be derived.

When reading the record carrier minute details, in the above example details of the order of magnitude of microns, must be detected. For this, use is made of an objective system with a high numerical aperture and a small depth of focus. Said objective system must ensure than the read beam is always sharply focussed onto the information structure. Owing to for example errors in the bearing of the record carrier or warping of the record carrier, or as a result of vibrations in the reading apparatus, it may happen that the track to be read moves axially relative to the objective system. The detector then does not only receive radiation from the track portion to be read, but also radiation from the vicinity of said portion. As a result the modulation depth of the signal supplied by the detector decreases, while moreover cross-talk may occur because not only one track is read but adjacent tracks are also illuminated. Therefore, is is of importance to be able to detect a deviation between the plane of focussing and the plane of the information structure to be read, so as to enable the focussing to be corrected.

It is an object of the present invention during reading of a record carrier of the type mentioned in the preamble to produce, in addition to an information signal, a focussing correction signal, the last-mentioned signal being obtained with a minimum of optical elements. In order to achieve this, a record carrier according to the invention is characterized in that at least one surface of a record carrier body exhibits periodic excursions, which excursions vary in the direction in which the tracks are read, and that the period of said excursions is substantially greater than the average period of the areas in the tracks.

The periodic excursions cause the read beam to be periodically focussed and defocussed on the plane of the track portion to be read. As a result, the signal supplied by the detector will be modulated periodically. From the variation of said modulation the magnitude of a deviation between the actual and the desired position of the plane of the track portion to be read can be derived.

The period of the excursions must be so much greater than the average period of the areas that in the detected signal the modulation as a result of the information may be readily distinguished, as regards frequency, from the modulation as a result of the periodical excursions. For a record carrier provided with a television program the period of the excursions is some hundreds of times greater than the average period of the areas in a track. The amplitude of the excursions will have to be selected so that the plane of the information structure is always within the depth of focus of the objective system. Said amplitude may be of the order of microns.

In principle, a record carrier according to the invention can be read with an apparatus employing only one beam of radiation and one detector. In an electric circuit, which is connected to the detector, a high-frequency component of the detector signal is separated from a low-frequency component. Said components are processed to an information signal and a control signal for focussing correction respectively. As for obtaining the control signal no additional optical elements are required, alignment problems which would occur during assembly of the read apparatus if the said additional elements were employed, are avoided. Moreover, no extra provisions need be taken in the read apparatus to compensate for vibrations which might occur between the additional optical elements during reading.

It is to be noted that in U.S. Pat. No. 3,673,412 it has been proposed when reading a record carrier provided with an optical information structure to derive both the information and the control signal for focussing of the read beam from the signal supplied by a single detector. In the known apparatus an oscillatory motion in a direction perpendicular to the record carrier is impressed on the radiation source which supplies the read beam. As a result, the read beam is periodically focussed and defocussed on the information structure. Since mechanical elements must be reciprocated the attainable frequency of oscillation is relatively low, too low to be used for reading a record carrier with a high information density, such as a record carrier with a television program. Furthermore, the known read apparatus is fairly intricate owing to the mechanical oscillation means.

Figure 2:
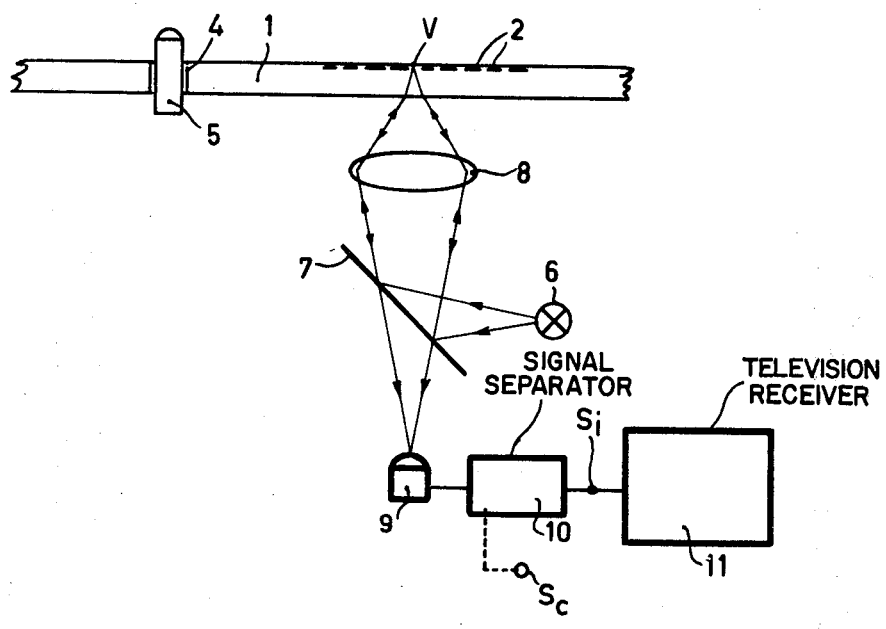
Figure 3:
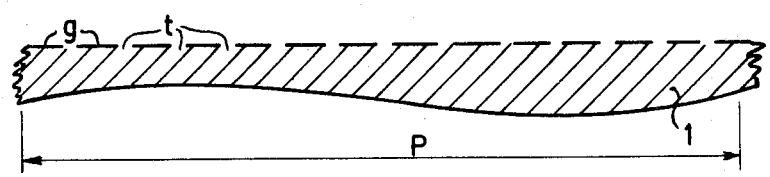
Figure 4:
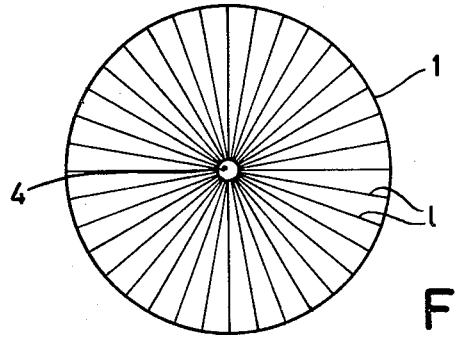
Figure 5:
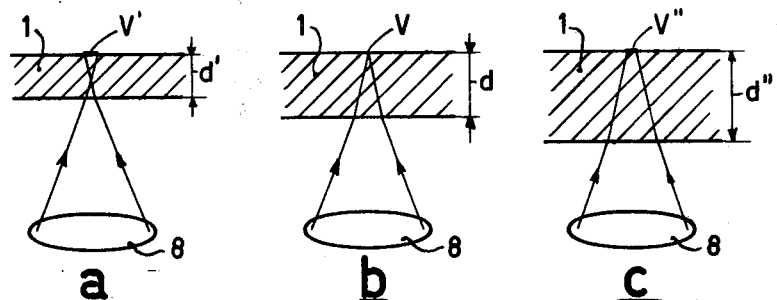
Figure 7:
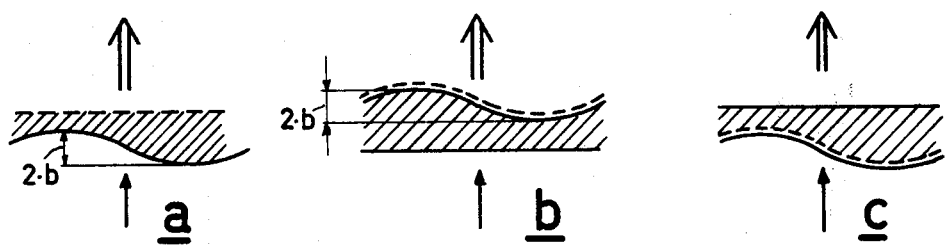
Figure 7:
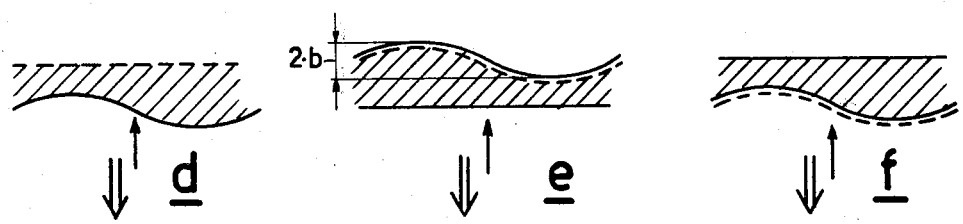
Figure 6:
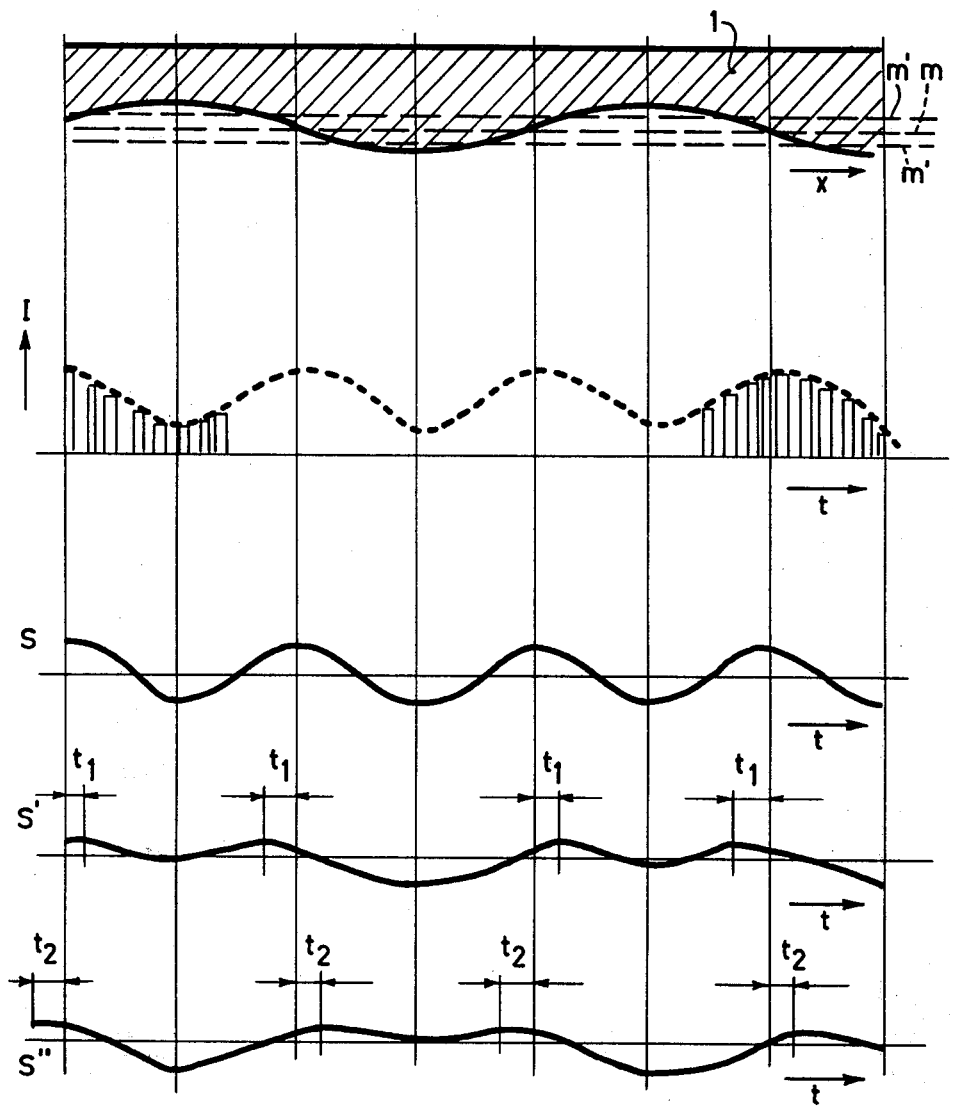

The invention will now be explained by describing its use in a round disk-shaped record carrier. For this, reference is made to the drawing, in which:

FIG. 1 shows a part of a known record carrier in top view,

FIG. 2 schematically shows an apparatus for reading a record carrier,

FIG. 3 in tangential cross-section shows a small part of a round disk-shaped record carrier according to the invention, FIG. 4 shows a bottom view of such a record carrier, FIGS. 5a, 5b and 5c illustrate the principle underlying the invention, FIG. 6 shows the time response of the signal derived from the record carrier according to the invention for various settings of the read objective, FIG. 7 shows some embodiments of a record carrier according to the invention.

On the round disk-shaped record carrier 1 shown in FIG. 1 a multitude of concentric or quasiconcentric tracks 2 are provided, of which only a few are shown. Between the information tracks structureless lands 3 are disposed. The tracks 2 comprise a multiplicity of areas g alternating with intermediate areas t. The lengths of the areas and the intermediate areas represent the stored information. When reading a track a read beam is modulated, so that said beam exhibits time variations in accordance with the sequence of areas and intermediate areas in a track.

The areas in a track can be distinguished from the intermediate areas and the lands between the tracks in various manner. For example, the transmission or the reflection coefficient of the areas may differ from those of the intermediate areas, so that a read beam is amplitude modulated. Alternatively, a read beam may be phase-modulated by the areas and the intermediate areas. This can be achieved by disposing the areas and the intermediate areas at different levels in the record carrier. Preferably, such a phase structure consists of a number of pits which are pressed in a reflecting record carrier at a depth of $\lambda/4$, $\lambda$ being the wave length of the radiation used for reading. Such a structure may for example be read with a radiation spot, or read spot, V (see FIG. 1) whose diameter is greater than the track width, but smaller than the sum of the widths of one track and two lands.

FIG. 2 shows an apparatus for reading a record carrier. The read beam emitted by a source 6 is reflected to an objective lens 8 by a semi-transparent mirror 7. Said objective lens forms a read spot V on the optical structure which contains the information, which is represented by the tracks 2. The optical structure, by way of example, is shown at the top surface of the record carrier. Upon reflection at the information structure the read beam passes through the objective lens 8 for a second time and said beam is then concentrated onto a radiation-sensitive detector 9 via the semi-transparent mirror 7. The output of the detector 9 is connected to an electronic circuit 10, in which the detector signal is processed into an information signal $S_i$, which for example is fed to a conventional color television receiving apparatus 11. If the radiation spot is projected onto an area g on the record carrier, the radiation is diffracted, so that a substantial portion of the reflected radiation falls outside the entrance pupil of the objective lens 8, and thus outside the radiation-sensitive area of the detector 9. When the radiation spot is projected outside an area g on the record carrier, most part of the reflected radiation is concentrated onto to the detector by the objective lens. The record carrier can be rotated with the aid of a shaft 5 which extends through a central opening 4 in the record carrier. By moving the read spot over a track the detector signal is modulated in accordance with the sequence of areas and intermediate areas in the track.

During reading deviations between the actual and the desired position of the plane of the track to be read may occur. Said deviations may be caused by out-of-flatness of the record carrier or, in the case of a round foil-like record carrier, by undulations which occur during rotation of the record carrier. Said deviations may result in a decrease of the modulation depth of the detector signal, while moreover cross-talk may occur. As a result, it is no longer possible to read the record carrier correctly. Therefore, it is essential that the deviation between the actual and the desired position of the plane of the track to be read can be detected.

According to the invention said deviation may be detected without the use of additional optical elements. For this purpose, a surface of the record carrier body exhibits periodical excursions, the direction of the period of the excursions being the direction in which the tracks are read.

FIG. 3 shows an embodiment of a record carrier according to the invention in tangential cross-section. Only a small part of one track is shown. The record carrier is assumed to be a thin, foil-like record carrier. The areas g, which represent the information, and the intermediate areas t are disposed at the upper surface of the record carrier. The lower surface of the record carrier body exhibits an undulating or bumpy surface. FIG. 4 shows a bottom view of the entire record carrier. The radially extending lines 1 connect points of equal height at the surface of the record carrier.

It is to be noted that in FIG. 3 the lengths of the areas and of the intermediate areas have been exaggerated relative to the period p of the excursions. In reality the period p is of the order of 100 to 1000 times as great as the average period of the areas g. When in FIG. 4 all tops of the surface were interconnected in a radial direction, the number of lines would have to be of the order of 100 to 1000.

The effect of the undulating shape, in the record carrier body surface is clarified by means of FIGS. 5a, 5b and 5c. Said Figures show cross-sections of each time other parts of a record carrier according to the invention. The thickness of the part shown in FIG. 5b is exactly such that the read beam is focussed onto the top surface of the record carrier, where the information structure is assumed to be located, by the objective lens 8. A read spot V of minimal size is obtained at the top surface of the record carrier. The thickness $d'$ of the part of the record carrier body shown in FIG. 5a is smaller than $d$. The plane of focussing of the objective lens 8 is then located inside the record carrier body. The read spot V' at the top surface of the record carrier body is larger than the read spot V. In FIG. 5c the thickness $d''$ of the record carrier body is greater than $d$. The plane of focussing of the objective lens is now located above the record carrier and the read spot V'' is larger than the read spot V.

Owing to the periodic excursions of the surface of the record carrier the read beam is periodically focussed and defocussed on the plane of the information structure. As a result, the modulation depth of the detector signal will change periodically, at low frequency, as is shown in FIG. 6. Said Figure shows how the intensity I of the detector signal varies as a function of time, when the read spot moves over a track in the direction of reading. It is assumed that the read beam is focussed at the level $m$, being the average level of the undulating surface. The pulses, whose pulse widths and pulse spacing represent the information, are amplitude modulated by the undulating shape of the surface. From the detector signal a low-frequency component can be derived with a response as represented by the curve S in FIG. 6.

If the read beam is not fucussed at the level $m$, but at a level $m'$, the said low-frequency component will have a response as that of the curve S' in FIG. 6. Whereas S only has the frequency corresponding to twice the spatial frequency of the periodic excursions, S' also exhibits the fundamental frequency corresponding to the spatial frequency of the perodic excursions. The instants at which the maxima in the curve S' are attained are shifted by a time interval $t_1$ relative to the instants at which the maxima in the curve S are attained. When the read beam is focussed on the level $m''$, the low-frequency component will have a shape like that of the curve S''. Said component also has the fundamental frequency, but now in phase-opposition relative to S', so that the time intervals at which the maxima are attained are shifted by a time interval $t_2$ relative to the instants at which the maxima in the curve S are attained. However, the shift is opposed to that which occurs in the case of the curve S'. The magnitude of a defocussing, if any, can be derived from the amplitude of the low-frequency component in the detector signal.

In an electronic circuit (10 in FIG. 1) which is connected to the detector a high-frequency and a low-frequency component can be derived from the detector signal, and the low-frequency component can be processed into a control signal $S_c$ with which the focussing can be corrected. The signal $S_c$ for example allows the focal length of the objective lens 8 to be changed. The objective lens may alternatively be suspended in a loudspeaker coil, and the signal $S_c$ may then be applied to said coil, so that the objective lens can be moved.

As is evident from FIG. 6, the direction of a defocussing may be derived from the low-frequency component of the detector signal. The phase of said component must then be compared with a reference phase. For this purpose, the record carrier may for example be provided with additional phase reference marks, which marks for example mark the points of maximum excursion of the undulating surface per revolution. Said marks may be detected by a separate read head. The marks may, for example, be mechanically, magnetically or optically detectable marks. In the event of a round disk-shaped record carrier the reference marks may be provided in a separate track at the inner or outer circumference of the record carrier.

When during manufacture of the record carrier it is possible to establish a fixed relationship between the variation of the periodic excursions of the undulating surface and the location of the information in the tracks, the reference mark may be provided in the information tracks, for example at the locations which correspond to the line synchronizing pulses if a television program is stored on the record carrier.

FIG. 7 schematically shows some embodiments of a record carrier according to the invention. The information structure is represented by a dash line. The unmodulated read beam is represented by a single arrow and the modulated beam by a double arrow. In the cases (a), (b) and (c) the information structure is a transmission structure, whereas in the other cases a reflection structure is provided. The amplitude of the periodic defocussing, as caused by the periodic excursions of the undulating surface is:

in cases $a$ and $b$ proportional to $$\frac{n_1 - n_2}{n_1} b$$

in cases $b$ and $c$ proportional to $$\frac{n_2}{n_1} b$$

and in cases $c$ and $f$ proportional to $b$, where $n_1$ is the refractive index of the material of the record carrier, $n_2$ is the refractive index of the surrounding medium, and $b$ represents the amplitude of the periodic excursions.

For most record carrier materials the refractive index is approximately 1.5. If the record carrier is located in air, the amplitude of the periodic defocussing is:

in cases $a$ and $d$ proportional to $$\frac{1}{3} b$$

in cases $b$ and $e$ proportional to $$\frac{2}{3} b$$

in cases $c$ and $f$ proportional to $b$.

To obtain the same effect, the amplitude of the excursions in cases $a$ and $d$ must be three times as high as in the cases $c$ and $f$. The embodiments $a$ and $d$, where the information is not stored at the undulating surface, may be selected only in the case of thin record carriers (foils). The diameter of the read beam must be small relative to the period of the excursions. If the read beam is focussed onto an information structure which is not situated at the undulating surface (cases $a$ and $d$), the diameter of said beam at the corrugated surface will be greater in the case of a thick record carrier.

With respect to the amplitude of the excursions of the undulating surface it is to be noted that the variations should remain within the depth of focus of the objective lens. The amplitude is determined by the permissible variations in modulation depth of the detector signal which may be introduced in the read beam by the undulation.

A record carrier with a reflecting information structure is to be preferred over a record carrier with a radiation-transmitting information structure, because less optical elements are required in the read apparatus. Some of the optical elements are traversed twice, so that vibrations between said elements have virtually no effect on the detector signal. Preferably use is made of a thick record carrier in accordance with $e$ in FIG. 7. The record carrier body then serves as a protective layer for the information, and ensures that scratches, dust particles and the like have substantially no influence on the read process. On the information structure of the record carrier according to FIG. 7 an additional protective layer may be provided.

It will be evident that the periodic focussing and defocussing may also be produced by undulating the two surfaces of a record carrier which is to be read through the record carrier body.

Instead of the sinusoidal variation of the excursions, as shown in the Figures, it is of course also possible to select a different variation of the excursions, such as a triangular variation, provided that said variation is periodic.

The concept underlying the invention is not restricted to a round disk-shaped record carrier, but may be also used for other record carriers such as a record carrier in the form of a tape.

Furthermore, the concept underlying the invention is not restricted to a specific type of information. Instead of a television programm it is also possible to store other data on the record carrier, such as photographic data or digital information.

The present invention is also applicable to a previously proposed record carrier U.S. Ser. No. 442,396 filed Feb. 14, 1974, in which the tracks, viewed in the lateral direction of the tracks, exhibit periodic excursions, whose period is substantially greater (for example 1000 times) than the average period of the areas in the tracks, while the amplitude of the excursions is smaller (for example five times) than the width of the tracks. Such a record carrier with "oscillating" tracks may be read with the aid of only one radiation beam and one detector. The information can be derived from the high-frequency component of the detector signal, whilst the low-frequency component provides an indication of the magnitude and the direction of a possible misalignment of the read spot relative to the track to be read.

If, according to the invention, a record carrier is provided with tracks having periodic excursions in the plane of the tracks and with a surface which has periodic excursions, a small number of optical elements suffices both for reading the information and for obtaining control signals for focussing the read beam and centering the read spot. Use may then be made of the apparatus of FIG. 2. The electrical signal supplied by the detector contains both the information and indications about the degrees of misalignment of the read spot and the focussing of the read beam.

If only one detector is used for reading the record carrier with oscillating tracks and an undulating surface, care must be taken that the spatial frequencies of the oscillations and of the excursions of the surface differ sufficiently, so as to enable a correct distinction between the signals for focussing control and those for alignment in the electronic circuit. The frequencies of the electrical control signals should have a spacing relative to each other which corresponds to for example the control band width in the electronic circuit 10. Furthermore, care must be taken that the spatial frequencies of the oscillations of the tracks and of the excursions of the surface have no harmonics in common.

The method of detecting the focussing of the read beam described above may only be used when the deviation of the distance between the plane of the information structure and the objective lens (18) is not excessive. According to the invention, however, a focussing coarse control can be achieved by a suitable choice of the size of the detector and by measuring the d.c. component of the detector signal. The d.c. component of the detector signal exhibits a substantial and virtually linear variation within a certain range (for example 10 to 40 μm) of deviations between the actual and the desired plane of focussing, if the radiation-sensitive surface of the detector has certain dimensions (for example 0.4 mm by 0.4 mm). By measuring the d.c. component in the electronic circuit and comparing it with a reference value coarse control can be achieved. Such a coarse control is, for example, necessary at the beginning of the read operation, upon insertion of the record carrier in the read apparatus.

What is claimed is:

1. A record carrier on which information is stored in an optically readable structure of areas and intermediate regions arranged along elongated tracks, said structure being readable with a servo focussed read beam of radiation, said areas having a different influence on said read beam of radiation than the intermediate regions, said areas having a length dimension in a direction substantially parallel to said tracks and a width direction substantially parallel to a major surface of said carrier, the improvement wherein at least one of said major surfaces of the record carrier exhibits periodic excursions of fixed amplitude and frequency in a direction perpendicular to said length and width dimensions of said areas for introducing dither into said servo focussed read beam, the period and amplitude of said excursions being substantially greater than the average period of the areas in the tracks.

2. A record carrier as claimed in claim 1, which is disk-shaped, the optically readable structure being a radiation-reflecting structure, the carrier body being radiaton-transmitting, and the surface of the carrier body which faces away from the optical structure constituting both the plane of incidence and the plane of emergence of the read radiation, wherein the surface of the record carrier body on which the radiation-reflecting structure is disposed exhibits said periodic excursions.

3. A record carrier as claimed in claim 1, in the form of a thin disk or foil, the optically readable structure being a radiation reflecting-structure, the carrier body being radiation-transmitting, and the surface of the record carrier body which faces away from the optical structure constituting both the plane of incidence and the plane of emergence of the read radiation, wherein the surface of the record carrier body which faces away from the optical structure exhibits said periodic excursions.

* * * * *

UNITED STATES PATENT AND TRADEMARK OFFICE
CERTIFICATE OF CORRECTION

PATENT NO. : 3,999,008
DATED : DECEMBER 21, 1976
INVENTOR(S) : GIJSBERTUS BOUWHUIS ET AL

It is certified that error appears in the above-identified patent and that said Letters Patent are hereby corrected as shown below:

IN THE CLAIMS

Claim 1, line 15, delete "and amplitude".

Signed and Sealed this

Sixth Day of June 1978

[SEAL]

Attest:

RUTH C. MASON
*Attesting Officer*

DONALD W. BANNER
*Commissioner of Patents and Trademarks*